United States Patent [19]

Dake et al.

[11] Patent Number: 5,624,698
[45] Date of Patent: Apr. 29, 1997

[54] STABLE BEVERAGE FOUNTAIN SYRUPS CONTAINING OIL PHASE AND METHOD OF STABILIZING FOUNTAIN SYRUP OIL PHASE

[75] Inventors: Timothy W. Dake, Cincinnati; Phillip F. Pflaumer, Hamilton, both of Ohio

[73] Assignee: The Procter & Gamble Company, Cincinnati, Ohio

[21] Appl. No.: 587,597

[22] Filed: Dec. 12, 1995

Related U.S. Application Data

[63] Continuation of Ser. No. 268,096, Jun. 28, 1994, abandoned.
[51] Int. Cl.$^6$ ........................................................ A23L 2/62
[52] U.S. Cl. ........................... 426/330.3; 426/330.5; 426/330.6; 426/573; 426/590; 426/599; 426/604; 426/654
[58] Field of Search ............................ 426/330.3, 330.5, 426/330.6, 590, 599, 573, 604, 654

[56] References Cited

U.S. PATENT DOCUMENTS

| | | | |
|---|---|---|---|
| 4,163,807 | 8/1979 | Jackman | 426/599 |
| 4,216,243 | 8/1980 | Hermann | 426/583 |
| 4,235,936 | 11/1980 | Kahn et al. | 426/330.3 |
| 4,332,824 | 6/1982 | Kahn et al. | 426/330.5 |
| 4,433,000 | 2/1984 | De Leon et al. | 426/599 |
| 4,528,205 | 7/1985 | Turrisi | 426/613 |
| 4,705,691 | 11/1987 | Kupper et al. | 426/590 |
| 4,722,847 | 2/1988 | Heckert | 426/74 |
| 4,986,994 | 1/1991 | Baccus, Jr. | 426/330.03 |
| 5,069,924 | 12/1991 | Baccus Jr. | 426/590 |
| 5,192,577 | 3/1993 | Masson | 426/602 |
| 5,240,732 | 8/1993 | Ueda | 426/597 |

FOREIGN PATENT DOCUMENTS

| | | | |
|---|---|---|---|
| 0358444 | 3/1990 | European Pat. Off. | A23L 1/22 |
| WO86/06747 | 5/1985 | WIPO | A23L 1/23 |
| WO9308704 | 5/1993 | WIPO | A23L 2/38 |

OTHER PUBLICATIONS

"Xanthan Gum–Natural Biogum for Scientific Water Control". *Kelco, Division of Merck & Co., Inc.*, (1988); Third Edition.
"Tic Pretested Ticaxan Xanthan Powder", *Tic gums, Inc.*
LaBell, F.; "Multi-use Milk Substitue"; *Food Processing*; (Nov. 1991); pp. 118, 120.
Baird, John K.; "Xanthan"; *Encyclopedia of Polymer Science and Engineering*, Second Edition, vol. 17, pp. 901–918.
Dziezak, editor "A Focus on Gums"; *Food Technology*, Food Technology's Special Reports: Institute of Food Technologists Chicago, IL, Mar. 1991, pp. 116–132.
Soler, M.P. et al. "Formulation of Coconut Milk with Pineapple Juice as a Base for Pina Colada", *Food Science and Technology Abstracts*; Nov. 1987; vol.19, No. 11; p. 63 (11 H 160).
U.S. application No. 08/192,205, Feb. 4, 1994, Heckert et al.

*Primary Examiner*—Helen Pratt
*Attorney, Agent, or Firm*—Eric W. Guttag; J. C. Rasser

[57] ABSTRACT

The present invention relates to a method for stabilizing beverage fountain syrups having a dispersed oil phase consisting essentially of incorporating into said syrups from about 0.02% to about 0.3% of a stabilizer which is xanthan gum.

The present invention further relates to beverage fountain syrup compositions, preferably dilute juice beverage fountain syrup compositions, comprising:
a) from about 0.02% to about 0.3% of a stabilizer which is xanthan gum;
b) from about 0.2% to about 3% oil:
c) from about 0.2% to about 10% of an emulsifier which is a modified food starch;
d) an effective amount of a flavor component:
e) an effective amount of sweetener; and
f) from about 30% to about 70% water;
wherein said syrup has a Brix value of from about 30° to about 70° ; and a modified food starch to oil ratio of from about 0.1 to about 4.

9 Claims, No Drawings

STABLE BEVERAGE FOUNTAIN SYRUPS CONTAINING OIL PHASE AND METHOD OF STABILIZING FOUNTAIN SYRUP OIL PHASE

This is a continuation of application Ser. No. 08/268,096, filed on Jun. 28, 1994, abandoned.

FIELD OF INVENTION

The invention relates to beverage fountain syrup compositions and a method for stabilizing beverage fountain syrups having a dispersed oil phase and a high Brix value.

BACKGROUND OF THE INVENTION

Beverage fountain syrups are concentrated forms of beverages which can be diluted with water or carbonated water to form a single strength, ready-to-serve beverage. Beverage fountain syrups are typically utilized by fast food and restaurant retail establishments. The public is most familiar with the carbonated cola beverages that are dispensed via "soda" fountains.

Currently health consciousness or awareness by the public has increased the demand for the availability of fruit and botanical juice beverages. Particularly, parents prefer juice beverages over carbonated cola beverages for their children.

Juice beverages, such as the dilute juice beverage SUNNY DELIGHT™, heretofore have not been readily available in fast food and restaurant retail establishments except in bottled or canned ready to drink forms. There is a need for juice beverages and particularly dilute juice beverages to be supplied in a beverage fountain syrup form which can be readily utilized in fountain machines.

Generally, single strength dilute juice beverages comprise a dispersed oil phase (sometimes referred to as an oil cloud). In single strength beverages which comprise an oil phase, thickener combinations, such as the combination of carboxymethylcellulose and xanthan gum, have been used to stabilize the oil phase, i.e., to keep the oil form separating. PCT Application No. 9308704, Bunger et al., published May 13, 1993, discloses a beverage thickener system comprising propylene glycol alginate, xanthan gum and guar gum. The thickener system provides for stable oil-in-water emulsions in beverages.

It has been discovered that in fountain syrups of dilute juice beverages having from 0.29% to about, high Brix value (generally from about 30° to about 70°), and no thickener, oil will separate from the syrup and rise to the top within a few days. Fountain syrups of dilute juice beverages having only carboxymethylcellulose or guar gum as the thickener show poor stability and separation of the oil phase occurs generally within about 35 days. Surprisingly, thickener systems that have been used for single strength beverages, and particularly dilute juice beverages, such as carboxymethyl cellulose/xanthan gum or propylene glycol alginate/ guar gum/xanthan gum have also shown poor stability such that separation of the oil begins visible separation generally within from about 24 to about 70 days at 70° F. (21° C.). In addition to providing poor stability of the oil phases, these conventional thickener systems can cause significant increases in the viscosities of the beverage fountain syrups which can hinder the ability of the fountain syrups to be pumped through a typical fountain machine resulting in a viscosity of greater than about 250 centipoise at 51 sec$^{-1}$ shear rate.

It is an object of the present invention to provide for a method for stabilizing the oil phase of beverage fountain syrups, particularly dilute juice beverage fountain syrups, having a high Brix value.

It is an object of the present invention to provide for beverage fountain syrups, particularly dilute juice beverage fountain syrups, which exhibit stability of the oil phase, i.e. no visible separation of the oil phase, for at least about 90 days, preferably at least about 120 days and most preferably equal to or greater than about 140 days at about 21° C. Further, it is an object that the beverage fountain syrups, particularly dilute juice beverage fountain syrups, have good pumpability.

SUMMARY OF THE INVENTION

The present invention relates to a method for stabilizing beverage fountain syrups having a dispersed oil phase consisting essentially of incorporating into said syrups from about 0.02% to about 0.3% of a stabilizer which is xanthan gum.

The present invention further relates to beverage fountain syrup compositions, preferably dilute juice beverage fountain syrup compositions, comprising:

a) from about 0.02% to about 0.3% of a stabilizer which is xanthan gum;

b) from about 0.2% to about 3% oil:

c) from about 0.2% to about 10% of an emulsifier which is a modified food starch;

d) an effective amount of a flavor component:

e) an effective amount of sweetener; and f) from about 30% to about 70% water;

wherein said syrup has a Brix value of from about 30° to about 70°; and a modified food starch to oil ratio of from about 0.1 to about 4.

DETAILED DESCRIPTION OF THE INVENTION

Definitions:

As used herein, the term "comprising" means various unnamed components can be conjointly employed in the compositions of this invention Accordingly, the terms "consisting essentially of" and "consisting of" are embodied in the term comprising.

As used herein the term "fruit flavors" refers to those flavors derived from the edible reproductive part of the seed plant, especially one having a sweet pulp associated with the seed, for example, apples, oranges, lemon, limes, etc. Also included within the term fruit flavor are synthetically prepared flavors made to simulate fruit flavors derived from natural sources. Particularly preferred fruit flavors are the citrus flavors including orange, tangerine, lemon, lime and grapefruit flavors. A variety of other fruit flavors can be used such as apple, grape, cherry, pineapple, coconut and the like. These fruit flavors can be derived from natural sources such as fruit juices and flavor oils or synthetically prepared. If desired, fruit juices, including orange, lemon, tangerine, lime, apple and grape can be used in a flavor component.

As used herein, the term "botanical flavor" refers to flavors derived from parts of the plant other than the fruit. As such, botanical flavors can include those flavors derived from nuts, bark, roots and leaves. Also included within this term are synthetically prepared flavors made to simulate botanical flavors derived from natural sources. Examples of botanical flavors include cola flavors, tea flavors, coffee and the like. These botanical flavors can be derived from natural sources such as essential oils and extracts or be synthetically prepared. Coffee, black tea, and herbal tea extracts can be used as the flavorant herein.

As used herein "single strength" refers to a single strength beverage, i.e. a ready-to-serve or consume beverage that does not require additional components such as water before consumption.

As used herein, the term "fruit juice" refers to citrus and non-citrus juices including vegetable juices. The fruit juice can be provided as juice made from apple, passion fruit, cranberry, pear, peach, plum, apricot, nectarine, grape, cherry, currant, raspberry, gooseberry, blackberry, blueberry, strawberry, lemon, lime, mandarin, tangerine, orange, grapefruit, potato, tomato, lettuce, celery, spinach, cabbage, watercress, dandelion, rhubarb, carrot, beet, cucumber, pineapple, coconut, pomegranate, kiwi, mango, papaya, banana, watermelon and cantaloupe. The term "fruit juice" also refers to water extracted soluble solids, fruit juice concentrates, comminutes and purees.

As used herein, the term "nutritionally-supplemental amount" is meant that the mineral and vitamin sources used in the practice of this invention provide a nourishing amount of minerals and vitamins. This is supplemental or in addition to the amount found in the average diet. This supplemental amount will provide from about 10% to about 200% of the Recommended Dietary Allowance (RDA). The RDA for vitamins and minerals is as defined in the United States of America (see Recommended Daily Dietary Allowance—Food and Nutrition Board, National Academy of Sciences—National Research Council).

As used herein the term "dilute juice beverage" means a single strength, ready-to-serve beverage comprising from 0% to about 50%, preferably from about 3% to about 35% and most preferably from about 5% to about 10% fruit juice.

As used herein the term "syrup", "fountain syrup" or "beverage fountain syrup" refers to a composition which when diluted with an appropriate amount of water forms a single strength beverage. Syrups as described herein are prepared at generally about five to six fold such that the syrup is diluted with four to five parts water by volume to form a single strength beverage. Most people are familiar with this syrup in relation to a dispenser that produces beverages from a mixture of syrup and water such as at a convenience store.

All percentages herein are by weight unless otherwise specified.

ESSENTIAL COMPONENTS OF FOUNTAIN SYRUP

Xanathan Gum

Xanthan gum is an exocellular heteropolysaccharide produced by a fermentation process using the bacteria *Xanthomonas campestris*. Xanthan gum is a polymer with five sugar residues, two glucose units, two mannose units, and one glucuronic acid. The backbone of the unit is a 1, 4 linked β-d-glucose. This backbone is identical in structure to cellulose. A reference for Xanthan structures, properties, and uses, is "Xanthan Gum, Natural Biogum for Scientific Water Control", 4th edition from Kelco, Division of Merck & Co., Inc., which is incorporated herein by reference. Xanthan is available in a variety of particle sizes, including 80-mesh and 200-mesh, preferably 200 mesh is used. Xanthan gums are available from many commercial sources including Kelco, a Division of Merck Company (California) and TIC Gums. A preferred commercial product is Keltrol F from Kelco.

Xanthan gum is utilized as a stabilizer of the dispersed oil in the syrup compositions. Xanthan gum is used at levels of from about 0.02% to about 0.3%, and preferably from about 0.05 % to about 0.2 % of the syrup compositions.

Oil

Oil is utilized in the syrup compositions to provide opacity or cloud to the single strength beverages made from the syrups. The oil produces a juice like appearance in the single strength dilute juice beverage. Suitable oils for use are oils such as vegetable oils, animal oils, synthetic oils, and mixtures thereof. Preferred for use are vegetable oils. Preferred unhydrogenated oils are soybean, sunflower, high oleic sunflower, safflower, cottonseed, corn, peanut, and canola oils. Partially hydrogenated oils can be used for oils requiring improved flavor stability.

The oil is utilized at a level of from about 0.2% to about 3%, preferably from about 0.3 % to about 2 % of the syrup composition.

The oil is typically incorporated into the composition as an oil-in-water emulsion which utilizes a modified food starch as an emulsifier. These are octenyl succinate modified starches ("OSAN-starch") which are also commonly referred to as lipophilic starches. They are typically made by treatment with from about 2% to about 3% 1-octenyl succinate arthydride. See "Modified Food Starches: Properties and Uses" Chapter 9, O. B. Wurzburg, editor, (1986) CRC Press, Boca Raton, Fla., which is incorporated herein by reference. Purity Gum BE (National Starch) is a suitable modified food starch derived from waxy maize which is commonly used as an emulsifier for beverage emulsions. Generally, the starch is utilized at from about 0.02% to about 10%, preferably from about 0.1% to about 4 %, of the syrup composition. The amount of starch used depends on the particular starch utilized and the amount of oil utilized. Typically, the modified starch to oil ratio is from about 0.1 to about 4 and preferably from about 0.2 to about 2.

Brominated vegetable oils and resin esters, in particular the ester gums, and other weighting agents are not preferred for use in the compositions. Most preferably, the syrup compositions are substantially free of weighting agents, typically this is less than about 0.05% and preferably less than about 0.01% of the syrup composition.

The turbidity of diluted beverages prepared from the syrup compositions of the present invention will generally be greater than 200 NTU's. The range is typically from about 1000 to about 15000 NTU's as a result of the dispersed oil phase. Preferably, the turbidity is from about 1500 to about 10000 NTU's and most preferably from about 2000 to about 5000 NTU's. Turbidity is a measure of the cloudiness or opacity of a beverage. One way of measuring turbidity is by determining how much light is scattered by a sample of the beverage. See "The Ratio Turbidimeter", Technical Information Series—Booklet No. 10, Hach Company, Loveland, Colo. A useful instrument for doing this is the DRT 100B Turbidimeter (HF Instruments, a Division of Shaban Mfg., Inc. Ft. Myers, Fla.). The measured turbidity is reported in NTU's (nephelometric turbidity unit. A higher number indicates a higher degree of turbidity or cloudiness. See "Relationship Between Sensory Clarity and Turbidity Values of Apple Juice", L. J. Malcolmson and L. Jeffrey, 1989 Can. Inst. Food Sci. Technol. J. 22(2); 129–32, which is incorporated herein by reference.

Flavor Component

The particular amount of the flavor component effective for imparting flavor characteristics to the syrup compositions depends upon the flavor(s) selected, the flavor impression desired and the form of the flavor.

The flavoring system can comprise a fruit juice, a fruit flavor, a botanical flavor or mixtures thereof. In particular the combination of tea flavors, preferably green tea or black tea flavors, together with fruit juices have an appealing taste. Preferred fruit juices and fruit flavors are apple, pear, lemon, lime, mandarin, grapefruit, cranberry, orange, strawberry, grape, kiwi, pineapple, tangerine, passion fruit, mango, guava, raspberry, and cherry. Citrus flavors and juices, preferably grapefruit, orange, lemon, lime, mandarin, tangerine and juices of mango, passion fruit, and guava, or mixtures thereof are most preferred.

The fruit flavors can be derived from natural sources such as fruit juices and flavor oils, or else be synthetically prepared.

The flavor component can also comprise a blend of various flavors, e.g. lemon and lime flavors, citrus flavors and selected spices (the typical cola soft drink flavor). Mixtures of flavors and juices can be used.

The syrup compositions of the present invention are preferably formulated such that upon dilution a dilute juice beverage is formed which comprises from 0% to about 50%, preferably from about 3% to about 35%, and most preferably from about 5% to about 10% fruit juice. For example, a preferred syrup composition which will provide 5% orange juice in the diluted beverage can comprise from about 4% to about 5% orange juice concentrate having a Brix of 60° or from about 20% to about 25% orange juice. One skilled in the art is familiar and capable of determining the requisite amount of juice, concentrate or puree needed in the syrup to achieve a particular targeted dilute beverage concentration.

Syrup compositions of the present invention which are substantially free of fruit juice typically comprise flavor components which are no more than about 15% of the syrup, preferably such flavor component comprises at least 0.004% of the beverage, and typically from about 0.04% to about 10%, and preferably from about 0.1% to about 0.4% of the beverage.

Sweetener

The syrup compositions of the present invention contain a sweetener in an amount sufficient to provide the desired flavor and texture. The syrup composition preferably comprises a carbohydrate sweetener.

The carbohydrate sweetener is preferably a mono- and or disaccharide sugar such as maltose, lactose, galactose, sucrose, glucose, fructose, invert sugars and mixtures thereof. Especially preferred is fructose. All of these sugars are typically incorporated into the syrup compositions as "syrups" (sugar dissolved or slurried in water), but they can likewise be incorporated in other forms, e.g. solid form. These sugars are also provided to some extent by other added materials in the compositions such as fruit juice, optional flavorants, and the like.

Fructose for use in the beverage product can be provided as liquid fructose, high fructose corn syrup, dry fructose or fructose syrup; it is preferably provided as high fructose corn syrup wherein at least about 42% by weight of the solids in the syrup are fructose. Preferred fructose sources are high fructose corn syrups wherein 42% of the solids in the syrup are fructose (HFCS 42), high fructose corn syrup wherein 55% of the solids in the syrup are fructose (HFCS 55), and liquid fructose (contains 99% fructose solids), all of which are available from A. E. Staley Manufacturing, Decatur, Ill.

Sugar alcohols can also be used in the syrup compositions of the present invention. These sugar alcohols include sorbitol, mannitol, and xylitol. Usually, however, these materials are not used as the sole sweetener because in the levels required to sweeten beverages, they have a side effect of flatulence or related gastrointestinal related problems.

For diet syrup compositions, non-caloric sweeteners can be used as long as the Brix is not lowered below about 30°. Thus, mixtures of non-caloric and caloric sweeteners are preferred. Mixtures of carbohydrates, low calorie sweeteners and artificial sweeteners can also be used in the present invention, i.e., a mixture of asparhame and sucrose or high fructose corn syrup can be used. Examples of such sweeteners include aspartame, saccharine, cyclamates, acetosulfam-K, L-aspartyl-L-phenylalanine lower alkyl ester sweeteners, L-aspartyl-D-alanine amides as disclosed in U.S. Pat. No. 4,411,925 to Brennan, et al (1983), L-aspartyl-D-serine amides disclosed in U.S. Pat. No. 4,399,163 to Brennan et al (1983), L-aspartyl-hydroxymethylalkane amide sweeteners disclosed in U.S. Pat. No. 4,338,346 issued to Brand (1982), L-aspartyl-1-hydroxyethylalkane amide sweeteners disclosed in U.S. Pat. No. 4,423,029 to Rizzi (1983), glycerins, synthetic alkoxy aromatics, etc. Lo Han Guo juice which contains a natural sweetener can also be used as a sweetener.

The amount of sweetener effective in the syrups of the present invention depends upon the particular sweeteners used and the sweetness intensity desired. Preferred syrup compositions comprise from about 30% to about 70% by weight sugar. In determining the amount of sugar of the present invention, any sugar or other sweetener present in the flavor component, such as fruit juice, is also included.

For carbohydrates or sugars, the amount of sweetener can be from about 30% to about 70%, and preferably from about 40% to about 65% by weight for the syrup compositions. The amount for artificial sweeteners generally ranges from about 0.001% to about 2%, preferably from about 0.01% to about 0.1%.

Syrup compositions of the present invention have a Brix value of from about 30° to about 70°, preferably from about 40° to about 65° and most preferably from about 50° to about 60°.

Added Water

Sufficient water is utilized to achieve the desired syrup concentration and Brix value. Water comprises from about 30% to about 70%, preferably from about 35% to about 60% and most preferably from about 40% to about 50%, of the syrup compositions. Water as used herein includes water from all sources, e.g., juice and sweetener.

Acidity

The syrup compositions of the present invention have a pH of from about 2.5 to about 4.5, preferably from about 2.7 to about 3.5. Calcium fortified syrup compositions typically have higher pH levels of from about 2.5 to about 4.5 and preferably from about 3 to about 4. This pH range is typical for non-carbonated dilute juice beverage products. The acidity can be adjusted to and maintained within the requisite range by known and conventional methods, e.g., the use of food grade acid buffers. Generally, citric, malic, phosphoric, fumaric, lactic and acetic acids are added and/or their salts, e.g., sodium citrate and potassium citrate. For non-carbonated beverages, citric acid is preferred. For calcium fortified beverages, citric and malic acids are preferred. Typically, the acidity within the above recited ranges is a balance between maximum acidity for microbial inhibition and optimum acidity for the desired beverage flavor and sourness impression.

OPTIONAL COMPONENTS

The syrup composition can additionally comprise from 0% to about 110% of the U.S. RDA of vitamins and minerals such that the vitamins and minerals are chemically and physically compatible with the essential elements of the beverage composition. Especially preferred are Vitamin A, and provitamins thereof (betacarotene), Vitamins C, D, E, B1, B6, B12, niacin, pantothenic acid, folic acid biotin, thiamin, calcium, magnesium, potassium, sodium, iron, zinc and mixtures thereof. Other optional ingredients are preservatives such as benzoic acid, sorbic acid and salts thereof, and natural and synthetic colors.

Viscosity

The viscosities of the syrup compositions will generally be no more than about 250 centipoise, more preferably no more than about 200 centipoise and most preferably no more than about 150 centipoise, at 70° F.(21° C.) and at a shear rate of 51 sec$^{-1}$ as measured with a Brookfield viscometer Model DV-III with coaxial cylinders such as spindle #31 or #34 and chamber 13R.

Method of Stabilizing Oil in Syrup Compositions

The present invention also relates to a method for providing stability of the oil phase in beverage fountain syrups by the addition of xanthan gum without the use of other stabilizers/thickeners, such as carboxymethylcellulose, guar gum, propylene glycol alginate, or mixtures thereof. Typically, this method provides for stability from separation of the oil phase from beverage fountain syrups comprising from about 0.2% to about 3%, preferably from about 0.3% to about 2%, oil and having a Brix value of from about 30° about 70°, preferably from about 40° to about 65° and most preferably from about 50° to about 60°. The method consists essentially of incorporating into said syrups from about 0.02% to about 0.3%, preferably from about 0.05% to about 0.2%, of a stabilizer which is xanthan gum.

The method provides for syrup compositions which exhibit stability of the dispersed oil phase, i.e., no visible separation of the oil phase, for at least about 90 days, preferably at least about 120 days and most preferably equal to or greater than about 140 days at about 21° C.

The syrup compositions preferably have a modified food starch to oil ratio of from about 0.1 to about 4 and preferably from about 0.2 to about 2.

Syrup Composition Preparation

The syrup compositions of the present invention can be prepared by conventional formulation techniques.

A method for preparing the beverage fountain syrup compositions herein is described as follows: 1. Added to water are the starch emulsifier and the oil to form a water-in-oil emulsion. The emulsion is homogenized for a sufficient period of time to form the emulsion. 2. Added to water with mixing are the stabilizer, sweetener, and flavor component as well as any optional components such as preservatives. 3. The emulsion of 1 is then add to the slurry of 2 with mixing. Calcium fortified beverage fountain syrups can be made and are encompassed by the present invention. Methods for making natural and manufactured calcium containing beverages, for example are described in U.S. Pat. No. 4,737,375 to Nakel et. al., U.S. Pat. No. 4,830,862 to Braun et al. and U.S. Pat. No. 4,722,847 to Heckert et. al., which are herein incorporated by reference.

The key aspect of the process of the present invention is mixing the requisite materials, in the requisite amounts, to achieve the beverage fountain syrup compositions of the present invention. Other well known and conventional variations of the above described formulation technique can, therefore, be used herein.

The following examples are given to illustrate the invention and are not intended to limit it in any way.

EXAMPLES

A syrup composition of the present invention is prepared as follows:

EXAMPLE 1

| Ingredient | Wt. % |
| --- | --- |
| Water | 27 |
| Xanthan Gum | 0.1 |
| HFCS-55 | 67 |
| Citric Acid | 3 |
| Sodium Citrate | 0.5 |
| Vegetable Oil | 1 |
| Purity Gum BE | 1.1 |
| Misc. Ingredients | |
| Preservatives, flavors, colors, vitamins | 0.5 |
| | 100 |

Method of Preparation

1. Starch and oil are added to about one fourth of the water to form an oil-in-water emulsion. The emulsion is homogenized with a Gaulin homogenizer (Model M-3 ).

2. Xanthan gum is dispersed and hydrated in the remaining water with good agitation. The high fructose corn syrup is then added and mixed. The other ingredients are then added with mixing. The emulsion is then added with mixing.

EXAMPLE 2

A syrup composition of the present invention is prepared as follows:

| Ingredient | Wt. % |
| --- | --- |
| Water | 27 |
| Xanthan Gum | 0.1 |
| HFCS-55 | 64 |
| Citric Acid | 2.2 |
| Sodium Citrate | 0.5 |
| Juice Concentrate | 5 |
| Vegetable Oil | 0.6 |
| Purity Gum BE | 0.6 |
| Misc. Ingredients | |
| Preservatives, flavors, colors, vitamins | 0.5 |
| | 100 |

Method of Preparation

1. Starch and oil are added to about one fourth of the water to form an oil-in-water emulsion. The emulsion is homogenized with a Gaulin homogenizer (Model M-3 ).

2. Xanthan gum is dispersed and hydrated in the remaining water with good agitation. The high fructose corn syrup is then added and mixed. The other ingredients are then added with mixing. The emulsion is then added with mixing.

EXAMPLE 3

A syrup composition of the present invention is prepared as follows:

| Ingredient | Wt. % |
|---|---|
| Water | 25 |
| Xanthan Gum | 0.1 |
| HFCS-55 | 64 |
| Citric Acid | 2.2 |
| Malic Acid | 1.1 |
| Calcium Hydroxide | 0.6 |
| Juice Concentrate | 5 |
| Vegetable Oil | 0.6 |
| Purity Gum BE | 0.6 |
| Misc. Ingredients | |
| Preservatives, flavors, colors, vitamins | 0.5 |
| | 100 |

1. Starch and oil are added to about one fourth of the water to form an oil-in-water emulsion. The emulsion is homogenized with a Gaulin homogenizer (Model M-3 ).

2. Xanthan gum is dispersed and hydrated in about one half of the water with good agitation. The high fructose corn syrup is then added and mixed. The juice concentrate and miscellaneous ingredients are added and mixed.

3. Citric and malic acids are added to the remaining one fourth of the water and mixed until dissolved. The calcium hydroxide is then added and mixed until dissolved. This solution is then added to the mixture from step 2 and mixed. The emulsion is then added with mixing.

What is claimed is:

1. A method for stabilizing beverage fountain syrup compositions having from about 0.2% to about 3% of a dispersed oil phase and a Brix value of from about 30° to about 70° consisting essentially of incorporating into said syrup compositions from about 0.02% to about 0.3% of a stabilizer which is xanthan gum and from about 0.2%–0.10% of an emulsifier which is a modified food starch, wherein the ratio of modified food starch to oil is from about 0.1 to about 0.4.

2. The method of claim 1 wherein the syrup composition comprises a modified food starch and has a modified food starch to oil ratio of from about 0.2 to about 2.

3. The method of claim 2 whereby the method provides for syrup compositions which exhibit stability of the oil phase for at least about 90 days.

4. A beverage fountain syrup composition comprising:
   a) from about 0.02% to about 0.3%, by weight, of a stabilizer which is xanthan gum;
   b) from about 0.2% to about 3%, by weight, oil;
   c) from about 0.02% to about 10%, by weight, of an emulsifier which is a modified food starch:
   d) an effective amount of a flavor component;
   e) an effective amount of sweetener; and
   f) from about 30% to about 70%, by weight, water;
   wherein said beverage fountain syrup composition has a Brix value of from about 30° to about 70° and a modified food starch to oil ratio of from about 0.1 to about 4.

5. A composition according to claim 4 wherein said beverage fountain syrup composition has a pH of from about 2.5 to about 4.5.

6. A composition according to claim 4 wherein said beverage fountain syrup composition exhibits stability of the oil phase for at least about 90 days.

7. A composition according to claim 6 wherein said beverage fountain syrup composition has a viscosity of no more than about 250 centipoise.

8. A beverage fountain syrup composition comprising:
   a) from about 0.05% to about 0.2%, by weight, of a stabilizer which is xanthan gum;
   b) from about 0.3% to about 2%, by weight, oil;
   c) from about 0.1% to about 4%, by weight, of an emulsifier which is a modified food starch;
   d) an effective amount of flavor component;
   e) an effective amount of sweetener; and
   f) from about 35% to about 60%, by weight, water;
   wherein said beverage fountain syrup composition has a Brix value of from about 40° to about 65° and a modified food starch to oil ratio of from about 0.2 to about 2.

9. A composition according to claim 8 wherein said beverage fountain syrup composition exhibits stability of the oil phase for at least about 120 days.

* * * * *